(12) United States Patent
Chateau

(10) Patent No.: US 6,564,046 B1
(45) Date of Patent: May 13, 2003

(54) METHOD OF MAINTAINING MOBILE TERMINAL SYNCHRONIZATION DURING IDLE COMMUNICATION PERIODS

(75) Inventor: Alain Chateau, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 475 days.

(21) Appl. No.: 09/625,902

(22) Filed: Jul. 26, 2000

(51) Int. Cl.$^7$ ................................................. H04B 1/16
(52) U.S. Cl. ........................ 455/343; 455/502; 455/574; 340/7.32; 375/354
(58) Field of Search ................................ 455/343, 574, 455/208, 502; 375/354; 331/2, 18, 25, 49; 340/7.32, 7.38

(56) References Cited

U.S. PATENT DOCUMENTS

| | | | | |
|---|---|---|---|---|
| 5,737,323 A | * | 4/1998 | Lansdowne ................ | 455/343 |
| 5,943,613 A | * | 8/1999 | Wendelrup et al. .......... | 455/343 |
| 5,987,339 A | * | 11/1999 | Asano ....................... | 455/574 |
| 5,995,820 A | | 11/1999 | Young et al. ................ | 455/343 |
| 6,029,061 A | * | 2/2000 | Kohlschmidt ................ | 455/343 |
| 6,088,602 A | * | 11/2000 | Banister ...................... | 455/574 |
| 6,212,398 B1 | * | 4/2001 | Roberts et al. ............. | 455/502 |
| 6,473,607 B1 | * | 10/2002 | Shohara et al. ............. | 455/343 |

FOREIGN PATENT DOCUMENTS

| | | | | |
|---|---|---|---|---|
| EP | 0 758 768 | 2/1997 | ............ | G06F/1/32 |
| EP | 0 924 947 | 6/1999 | ............ | H04Q/7/32 |

* cited by examiner

*Primary Examiner*—Lee Nguyen
(74) *Attorney, Agent, or Firm*—Ronald O. Neerings; Wade James Brady, III; Frederick J. Telecky, Jr.

(57) ABSTRACT

A method and structure of recovering a network time-base for radio data demodulation after an IDLE period of data communication gauges a local low frequency oscillator versus the high frequency local oscillator to compute the IDLE time as an equivalent number of low frequency oscillator clock periods. Depending upon the high frequency oscillator value, the accuracy of the gauging will directly determine the IDLE period duration versus the gauging period duration in order to keep an acceptable gauging error related to the sampling errors.

20 Claims, 3 Drawing Sheets

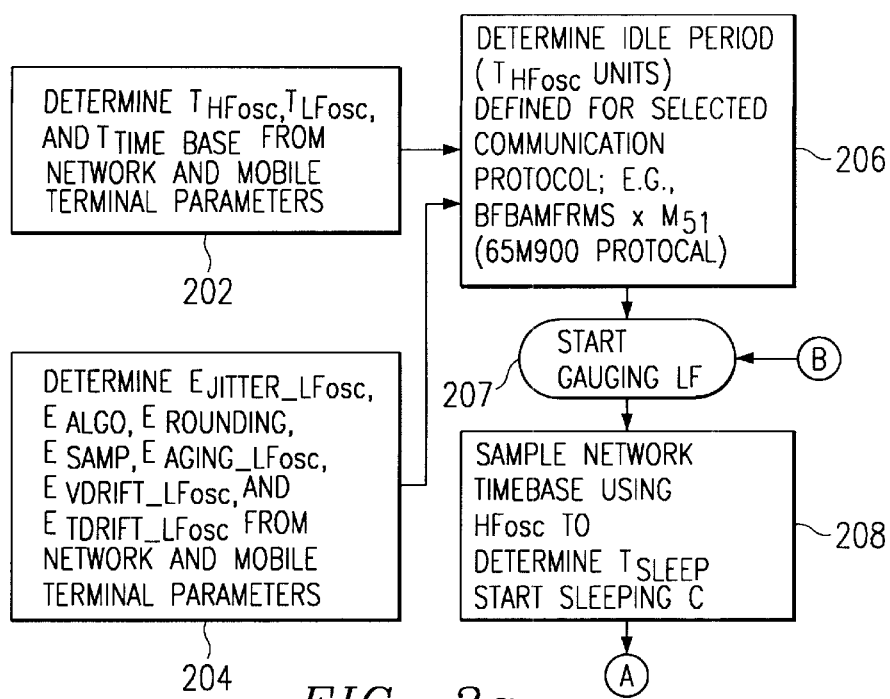
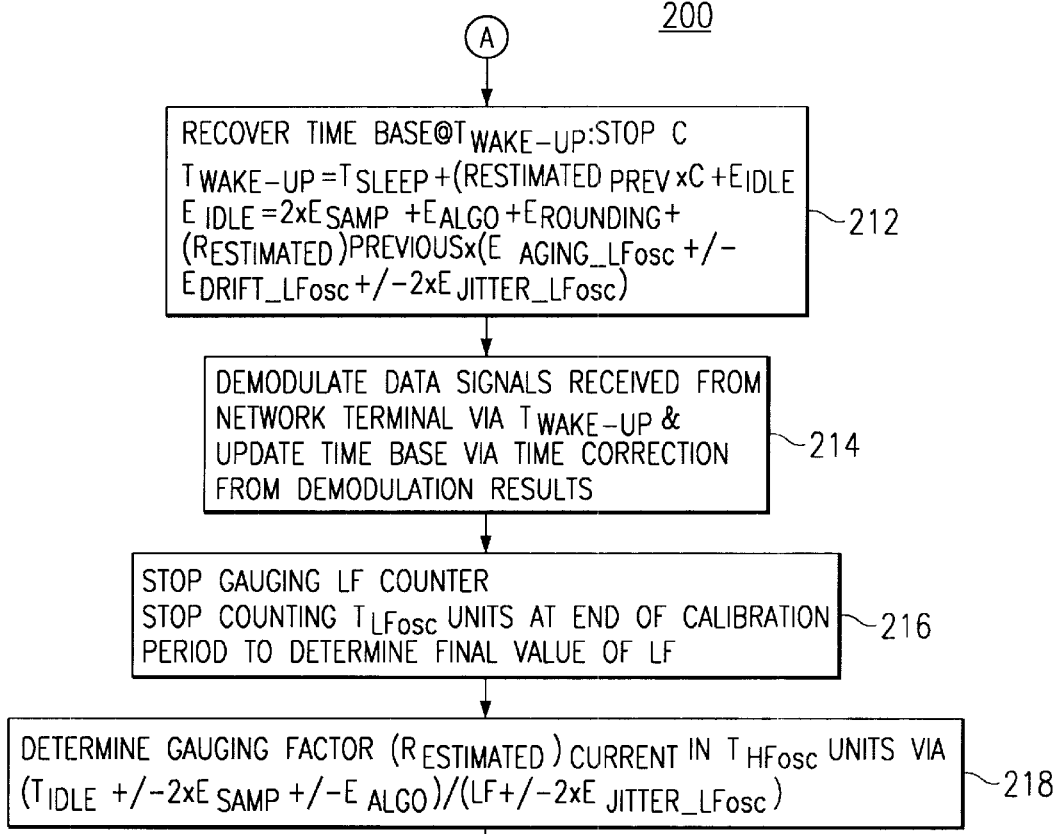
FIG. 2a
FIG. 2b

METHOD OF MAINTAINING MOBILE TERMINAL SYNCHRONIZATION DURING IDLE COMMUNICATION PERIODS

BACKGROUND OF THE INVENTION

1. Field of the Invention

This invention relates generally to wireless communications, and more particularly to a method of recovering a network time base for radio data demodulation after an IDLE period of communication.

2. Description of the Prior Art

A mobile terminal is required to keep itself permanently synchronized on a network time to accurately demodulate data received through a radio link. Further, the accuracy of a base-station oscillator (e.g., 0.01 ppm) is better than the accuracy of a mobile oscillator (e.g., 0.3 ppm). This difference in oscillator accuracy causes the local time associated with the mobile terminal to drift away from the network time associated with the base-station. Periodic re-synchronization is therefore required to minimize the foregoing time drift consistent with maintaining demodulator performance associated with the mobile terminal. The re-synchronization operation is based on the demodulation of received data which includes a predetermined training sequence to compute time and frequency differences between the base-station and the mobile terminal.

During IDLE mode, no radio transmission occurs, thus removing any possibility of re-synchronization. Since the IDLE period duration is defined by a radio standard protocol, the accuracy of the mobile terminal time-base clock must be high enough to allow a global time drift in the time range imposed by the demodulator performances.

Present methods of re-synchronization require constant activation of a mobile terminal high-frequency local oscillator to maintain the synchronization of the mobile time with the network time during IDLE periods. Such methods lead to high current consumption during an IDLE mode since the mobile terminal high-frequency oscillator and its associated clocking elements and counting logic will be active. A significant disadvantage of these present methods relates to shortened battery life and therefore increased operating costs associated with mobile communication terminals.

In view of the foregoing, it would be desirable to have a method of re-synchronizing a mobile communication terminal on the network, e.g., global system for mobile communication (GSM) network, during inactive communication periods, i.e., IDLE mode.

SUMMARY OF THE INVENTION

The present invention is directed to a method of recovering a network base-station time base for radio data demodulation within a mobile terminal after an IDLE period of communication. The method gauges a low frequency local oscillator within the mobile terminal versus the network time of a radio-communication network. A local time-base within the mobile terminal stores the network time while using a local and highly stable high-frequency oscillator. The local high-frequency oscillator is shut down during the IDLE period. The local time-base is periodically updated during non-IDLE periods with a time delta correction resulting from a demodulation of received communication data. The equivalent elapsed network time during the IDLE period is computed from a mobile terminal counter using a local low-frequency counter that is clocked via the low frequency local oscillator. The local low frequency oscillator is gauged versus the local time-base with the sampling of the time-base value when starting and stopping the gauging. The gauging process does not require updating of the local time-base during the gauging period. The local time-base is then restored subsequent to an inactive period (IDLE) and having sufficient accuracy to reliably demodulate communication data. This gauging process eliminates the necessity for maintaining the high frequency local oscillator within the mobile terminal during the gauging process, thereby providing for interlacing of the gauging and IDLE periods. This gauging process further makes the accuracy of the restored local time-base independent of the duration of the inactive period (IDLE).

As used herein, the following words have the following meanings. The words "algorithmic software" mean an algorithmic program used to direct the processing of data by a computer or data processing device. The words "data processing device" as used herein refer to a CPU, DSP, microprocessor, micro-controller, or other like device and an interface system. The interface system provides access to the data processing device such that data could be entered and processed by the data processing device. The words "discrete" data as used herein are interchangeable with "digitized" data and "digitized" data as used herein means data which are stored in the form of singularly isolated, discontinuous data or digits.

One embodiment of the present method of keeping a local time-base in a mobile terminal synchronized with a network time-base during a network IDLE transmission period comprises the steps of:

a) starting a low frequency gauging counter C to track local low frequency (LF) oscillator cycles associated with the mobile terminal;

b) sampling the network time-base near the end of a network data transmission period via a local high frequency (HF) oscillator associated with the mobile terminal, upon starting the gauging counter C, to determine a network time-base value $T_{SLEEP}$;

c) starting an IDLE transmission period LF counter at time $T_{SLEEP}$;

d) stopping the local HF oscillator upon starting the IDLE transmission period LF counter;

e) stopping the IDLE transmission period LF counter at time $T_{WAKE-UP}$, where $T_{WAKE-UP}$ is dependent on the network time-base value $T_{SLEEP}$, a count value LF stored by the IDLE transmission period LF counter during the IDLE transmission period, and a gauging factor $R_{estimated}$ associated with a most recently previous network IDLE transmission period for the local LF oscillator in HF oscillator period units according to the relationship defined by $T_{WAKE-UP} = T_{SLEEP} + ((R_{estimated})_{Previous} * LF) + E_{IDLE}$;

f) starting the HF oscillator at time $T_{WAKE-UP}$ to implement demodulation of network time-base transmission signals and thereby recover the network time-base such that the mobile terminal can be synchronized with the network time-base;

g) stopping the low frequency gauging counter C upon recovery of the network time-base and determining an elapsed count value associated with the gauging counter C;

h) generating a new gauging factor $(R_{estimated})_{New}$ for the LF oscillator in HF oscillator period units associated with the mobile terminal wherein the gauging factor R$_{estimated}$ is dependent on the elapsed count value associated with the gauging counter C; and i) repeating continuously steps a–h.

A structure suitable for implementing the present method comprises a mobile terminal system for keeping a local time-base synchronized with a network time-base during a network IDLE transmission period, the system comprising:

an IDLE period timer;

a data processing device;

an algorithmic software directing the data processor; and a data storage unit, wherein discrete IDLE period data, discrete low frequency oscillator data, discrete high frequency oscillator data, discrete sampling error data, discrete algorithmic error data, discrete low frequency oscillator jitter data, discrete network time-base data, discrete rounding data, discrete low frequency oscillator aging data, and discrete low frequency oscillator drift data are stored and supplied to the data processing device such that the data processing device, directed by the algorithmic software, can automatically determine a time-base value $T_{WAKE-UP}$, using algorithmically defined relationships among the discrete data and thereby cause the IDLE period timer to modulate the IDLE transmission period in response to the time-base value $T_{WAKE-UP}$, such that the mobile terminal can function to be synchronized with the network time-base.

A feature of the present invention is associated with recovery of a network time-base necessary to accommodate communication data demodulation following an IDLE period via a local low frequency/low accuracy oscillator within a mobile terminal.

Another feature of-the present invention is associated with a synchronization method rendering a mobile terminal capable of maintaining synchronization during IDLE periods (no radio traffic) without using a local high frequency oscillator.

Still another feature of the present invention is associated with a method of operating a mobile terminal during IDLE periods such that the mobile terminal power consumption is substantially reduced.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein:

FIGS. 2A and 2B depict a block diagram illustrating a method of recovering a network time base to accommodate radio data demodulation within a mobile terminal after an IDLE period of communication between a base-station terminal and a mobile terminal in accordance with one embodiment of the present invention.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The substitution of a low-frequency oscillator for the high frequency oscillator within a mobile terminal, e.g., phone, to maintain a network time during the IDLE period will decrease the overall power consumption of the mobile phone in IDLE mode. This is so as the high-frequency oscillator and its clock shaper will be halted and the clock tree frozen, thereby reducing the activity of the local time-base counting logic by a ratio determined by the magnitude of the oscillator frequencies.

Figure 1:
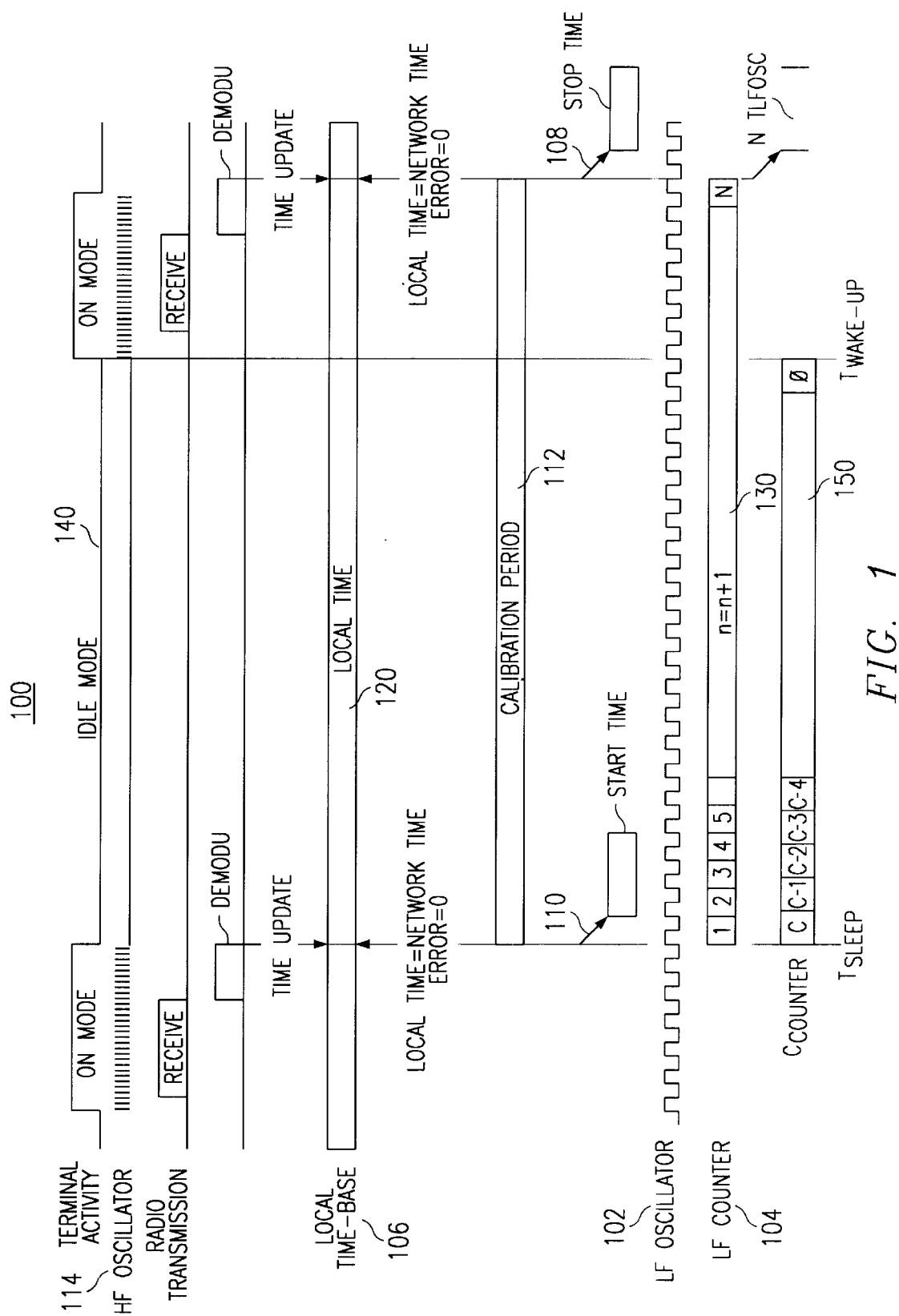
FIG. 1 is a chronogram illustrating relationships among data signals associated with a base station terminal and data signals associated with a mobile terminal during periods of both active data communication and no data communication (IDLE) in accordance with one embodiment of the present invention.

FIG. 1 is a chronogram 100 illustrating relationships among data signals associated with a base station terminal and data signals associated with a mobile terminal during periods of both active data communication and no data communication (IDLE) in accordance with one embodiment of the present invention. The principles of the present invention, as set forth herein, are accommodated via calibration of the mobile terminal low frequency (LF) clock (oscillator) 102 in association with a single LF counter 104 and two memory registers for storing a local time base 106. The present method then replaces the conventional and well-known method of calibrating the LF clock using 2 concurrent counters respectively clocked on the LF and HF oscillators. The present calibration principle is to store the network time at the beginning and at the end of the calibration periods 112 thereby providing the equivalent elapsed network time by subtracting the start time 110 from the stop time 108. The network time is maintained in a local time base 106. The accuracy of the measured network time is determined by the accuracy of the network time and is not determined by the accuracy of the local high frequency oscillator 114 since the measured network occurs after the local high frequency oscillator 114 has been re-synchronized with the network time. Thus, in order to minimize the time error between the local time and the network time, the start time 110 and the stop time 108 of the calibration period 112 must be timed on the re-synchronization events of the local time-base (update following the demodulation of received communication data).

A more complete explanation of the foregoing signal relationships and time periods are set forth herein below with reference to the chronogram 100. First, the gauging period is defined as:

$$T_{GAUGING}=(T_{STOP}-T_{START})+E_{GAUGING}; \qquad (1)$$

where $T_{STOP}$ and $T_{START}$ are the stop time 108 and start time 110 of the calibration period 112.

If N is the number of elapsed periods of $LF_{OSC}$ 102 (counter content), and $M_{MEASURED}$ is the number of elapsed periods of $HF_{OSC}$ 114 (delta of the 2 storage registers storing the local time base 106), then:

$$T_{STOP}-T_{START}=M_{MEASURED}*T_{HF_{OSC}} \qquad (2)$$

$$T_{GAUGING}=N*T_{LF_{OSC}} \qquad (3)$$

$$E_{GAUGING} = (+/-2 * E_{JITTER\_LFOSC}) * T_{LFOSC}; \quad (4)$$

where $T_{GAUGING}$ is in LF oscillator 102 period units;

$T_{STOP}$ and $T_{START}$ are in HF oscillator 114 period units; and $E_{JITTER\_LFOSC}$ is the LF oscillator 102 jitter in worst case condition temperature/voltage and equals the maximum instantaneous duty-cycle variation of $LF_{OSC}$ 102.

Further, if $M_{theorical}$ is the true equivalent number of elapsed periods of $HF_{OSC}$ 114, then:

$$T_{STOP} - T_{START} = (M_{theorical} +/- 2*E_{SAMPLING} +/- 2*E_{ALGO}) * T_{HFOSC}; \quad (5)$$

where $E_{SAMPLING}$ is the sampling error due to the synchronization of the LF oscillator based counter events on the HF oscillator 114 clock (sampling error when starting and stopping the counter) and is less than one period of $HF_{OSC}$ 114; and $E_{ALGO}$ is the error value in HF oscillator 114 period units of the time-base value versus the real network resulting from the inaccuracy of the demodulation algorithm delivering the time-base correction value.

Although the theoretical result of the present gauging can be shown as $$R_{theorical} = T_{LFOSC} / T_{HFOSC} = M_{theorical} / N, \quad (6)$$

a more accurate result of the present gauging, based upon the foregoing discussion, is seen by equation (7) below to be:

$$R_{estimated} = M_{measured} / (N +/- 2*E_{JITTER\_LFOSC}) = (M_{theorical} +/- 2*E_{SAMPLING} +/- 2*E_{ALGO}) / (N +/- 2*E_{JITTER\_LFOSC}) \quad (7)$$

The IDLE mode 140 can be defined as a time period during which the high-frequency reference clock (Oscillator) 114 is switched off and, consequently, the reference time-base stopped, as stated herein before. When exiting the IDLE mode 140, the equivalent network time at that current instant in time must be computed in order to recover the local time-base and, consequently, to be able to demodulate subsequent received communication data. During the IDLE mode 140 wherein the HF oscillator 114 clock is halted, the present time management system will use a counting system C 150 that is clocked on the LF oscillator 102. This system must be activated before the stop of the HF oscillator 114 and deactivated after the restart of the HF oscillator 114. The stop and start events of the counting system C 150 will be re-synchronized on the HF oscillator 114 in order to synchronize the LF counting system 104 with the HF local time-base 120.

The time-base can therefore be recovered using equation (8) for $T_{WAKE\-UP}$.

$$T_{WAKE\-UP} = T_{SLEEP} + T_{IDLE} + E_{IDLE} = T_{SLEEP} + (R_{estimated} * C) + E_{IDLE}; \quad (8)$$

wherein $$E_{IDLE} = 2*E_{SAMPLING} + E_{ALGO} + E_{ROUNDING} + R_{estimated} * (E_{AGING\_LFOSC} +/- E_{DRIFT\_LFOSC} +/- 2*E_{JITTER\_LFOSC}); \quad (9)$$

wherein

C is the value at the end of the IDLE period of the C counter 150 in LF oscillator 102 period units;

$T_{WAKE\-UP}$ is the recovered value: of the time-base in HF oscillator 114 period units;

$T_{SLEEP}$ is the sampled value of the time-base in HF oscillator 114 period units when starting the LF counter 104;

$E_{ROUNDING}$ is the rounding error when computing (R*C) and is less than one-half the period of the time-base;

$E_{SAMPLING}$ is the sampling error due to the synchronization of the LF oscillator 102 based C counter 150 events on the HF oscillator 114 clock (sampling error when starting and stopping the C counter 150) and is less than one period of the HF oscillator 114;

$E_{AGING}$ is the aging error of the LF oscillator 102 and can be estimated to be zero or non-existent for mobile applications wherein the IDLE period is on the order of only a few seconds;

$E_{JITTER\_LFOSC}$ is the LF oscillator 102 jitter in worst case condition temperature/voltage and is equal to the maximum instantaneous duty-cycle variation of the LF oscillator 102;

$E_{ALGO}$ is the time error in HF oscillator 114 period units of the time-base value versus the real network resulting from the inaccuracy of the demodulation algorithm delivering the time-base correction value; and $E_{DRIFT\_LFOSC}$ is the LF oscillator 102 time drift during the IDLE period and is due to the voltage variation (regulator output ripple voltage) and to the temperature variation;

$E_{DRIFT\_LFOSC}$ is therefore the sum of $E_{VDRIFT\_LFOSC}$ and $E_{TDRIFT\_LFOSC}$.

An application of the technique set forth above is now presented in detail below to exemplify the principles of the present invention. The instant application is directed to GSM900 communications using a 32 kHz LF oscillator in association with operational parameters from a commercially available ultra low power down controller specification as shown in Table 1 below.

TABLE 1

(Parameters & Numerical Values)

| Parameter | Value | Comment |
| --- | --- | --- |
| $T_{HFosc}$ | 77 ns | $F_{HFosc}$ = 13 MHz |
| $T_{LFosc}$ | 30,517 µs | $F_{LFosc}$ = 32 KHz |
| $T_{TimeBase}$ | 308 ns | $F_{TimeBase}$ = 13/4 MHz (~1/16 GSM bit) |
| $E_{JITTER\_LFosc}$ | $5 * 10^{-3}$ | +/- 0.5% duty cycle worse case in TSC6K for OSC32K |
| $E_{ALGO}$ | $24 * T_{HFosc}$ | GSM chipset demodulator accuracy ~1/2 GSM bit |
| $E_{ROUNDING}$ | $½ * T_{TimeBase}$ | SW or HW solution of implementation |
| $E_{SAMPLING}$ | $1 * T_{HFosc}$ | Start & stop re-synchronization on 13 MHz |
| $E_{AGING\_LFosc}$ | 2 ppm/year | Aging not meaningful on short time period (few ns) |
| $E_{VDRIFT\_LFosc}$ | 45 ppm | 32 KHz oscillator frequency drift versus voltage (1V5/3V6) |
| $E_{TDRIFT\_LFosc}$ | 5 ppm | 32 KHz oscillator frequency drift versus T° C. (−40/+80) |

The GSM900 protocol defines the IDLE period as:

$$T_{IDLE} = bfbamfrms * M_{51} \text{ with } 2 < bfbamfrms < 9 \text{ and } M_{51} = 51*1250*48 T_{HFOSC} \quad (10)$$

Table 2 illustrates the results of using the present method of time-base recovery to recover the value of the time-base in HF oscillator 114 period units for a $T_{IDLE}$ range between $2*M_{51}$ and $9*M_{51}$.

TABLE 2

(Time Recovery Error Versus Gauging Duration)

| $T_{IDLE}$ | $T_{GAUGING}$ | $T_{HFosc}$ units | $T_{LFosc}$ units | $R_{estimated}$ | $T_{GSM\_Error}$ | |
|---|---|---|---|---|---|---|
| $9 * M_{51}$ | $1 * T_{IDLE}$ | $27,540 * 10^{+3}$ | 68,850 | 400.00078 | $86.0\ T_{13M}$ | $1.79_{GSM\ bits}$ |
| $4 * M_{51}$ | $1 * T_{IDLE}$ | $12,240 * 10^{+3}$ | 30,600 | 400.00176 | $86.0\ T_{13M}$ | $1.79_{GSM\ bits}$ |
| $2 * M_{51}$ | $1 * T_{IDLE}$ | $6,120 * 10^{+3}$  | 15,300 | 400.00353 | $86.0\ T_{13M}$ | $1.79_{GSM\ bits}$ |

The above results are obtained with $T_{GAUGING}$ is equal to $T_{IDLE}$ due to interlacing the calibration period 112 and the IDLE period 140 as described above. When bfbamfrms=9, for example, $T_{IDLE}$ is determined as follows:

$$T_{IDLE} = 68,850 * T_{LFosc} = 27,540,000 * T_{HFosc}$$
$$= 68,850 * R_{theorical} * T_{HFosc}$$

with $R_{theorical} = T_{LF_{OSC}} / T_{HF_{OSC}}$ as shown by equation (6) above. In fact, $R_{estimated}$ can be determined by equation (7):

$$R_{estimated} = (27,540 * 10^{+3} + 2 * E_{SAMP} + 2 * E_{ALGO})/(68,850 - 2 * E_{JIT\_LFosc})$$
$$= (27,540 * 10^{+3} + 2 + 2 * 24)/(68,850 - 2 * 5 * 10^{-3})$$
$$= 400.00078 \text{ as shown in Table 2 above.}$$

The time-base value ($T_{WAKE-UP}$) at the end of the IDLE period using equations (8) and (9) with C being the 32 KHz counter value, then will be:

$$T_{WAKE-UP} = T_{SLEEP} + T_{IDLE} + E_{IDLE}$$
$$= T_{SLEEP} + (R_{estimated} * C) + E_{IDLE}$$
$$= T_{SLEEP} + (R_{estimated} * C) + 2 * E_{SAMP} + E_{ALGO} +$$
$$E_{ROUNDING} + R_{estimated} *$$
$$(E_{AGING\_LFosc} + 2 * E_{JITTER\_LFosc} + E_{DRIFT\_LFosc})$$
$$= T_{SLEEP} + (400.00078 * C) + 2 + 24 + 2 +$$
$$400.0078 * (0 + 2 * 5 * 10^{-3} + 45 * 10^{-6} + 5 * 10^{-6})$$
$$= T_{SLEEP} + (400.00078 * C) + 32.00$$
$$= T_{SLEEP} + (400 * C) + 86.00$$

Then, with C=68,850 for an IDLE period of $T_{IDLE}=9*M_{51}$, as described above with reference to Table 2, the time uncertainty on the recovered GSM time is:

$$T_{GSM\_Error} = 1.79 * GSM \text{ bits, with GSM bit}=48*T$$

Since, the maximum allowable GSM900 time error for data demodulation as defined in GSM recommendations is 3*GSM bits, the present method of time-base recovery is seen to provide a significant advancement in the art of demodulation that is useful in GSM applications among other protocols.

FIGS. 2A and 2B depict a block diagram 200 illustrating a method of recovering a network time base to accommodate radio data demodulation within a mobile terminal after an IDLE period of communication between a base-station terminal and a mobile terminal in accordance with a preferred embodiment of the present invention. The present method begins by first determining the periods $T_{HF_{OSC}}$, $T_{LF_{OSC}}$ and $T_{TimeBase}$ associated with the high frequency oscillator 114, low frequency oscillator 102 and network time-base respectively as shown in block 202. Simultaneously, error parameters associated with the demodulator hardware associated with the local time-base 106 are determined along with error parameters associated with sampling, approximation and algorithmic techniques necessary to implement the present method as shown in block 204. Upon determination and entry of the foregoing parameters, the method continues by next determining the IDLE period $T_{IDLE}$ in HF oscillator 114 units ($T_{HF_{OSC}}$ units) as shown in block 206. The present method can accommodate a wide variety of data communication protocols. Since each data communication protocol will have a set of communication characteristics such as a frequency of transmission and idle period defined by a particular industry standard, the present method 200 is described in terms of a GSM900 data communication protocol that is unique to GSM data communications in order to simplify explanation of the present method 200. As stated above, the present invention is not so limited however, and can accommodate a wide variety of data communication protocols. Thus, $T_{IDLE}$ is determined via equation (10) as set forth and defined for the GSM900 data communication protocol. Subsequent to determination of the foregoing time periods and error parameters, a low frequency (LF) gauging counter $LF_{counter}$ 104 is started and the network time-base is sampled using the local HF oscillator 114 to determine the network time $T_{SLEEP}$ at the beginning of the IDLE period 140 as shown in blocks 207 and 208. The local HF oscillator 114 is shut down immediately following the turn-on of the IDLE period C counter 150 in order to preserve mobile terminal power consumption during the IDLE period 140. When the IDLE period 140 ends, the HF oscillator 114 is then turned back on and the C counter 150 subsequently turned off as shown in block 212. When exiting the IDLE mode 140, the equivalent network time at that current instant in time is computed in order to recover the local time-base and, consequently, to be able to demodulate subsequent received communication data. Since the C counter 150 will then be characterized by a number C of counts taken during the IDLE mode 140, the local time-base $T_{WAKE-UP}$ can be determined using the foregoing values for $T_{SLEEP}$ and C in combination with a gauging factor that was determined in association with the most immediately preceding IDLE mode 140, also shown in block 212. Using the computed equivalent network time at $T_{WAKE-UP}$, the data signals received from the network terminal can then be demodulated and the local time-base updated using results of the demodulated data signals as depicted in block 214. Once the local time-base has been updated, the LF gauging counter 104 is stopped as shown in block 216. Since the number LF of low frequency oscillator 102 periods has been determined, a gauging factor $R_{estimated}$ can then be determined in HF oscillator 114 units as shown in block 218 by using equation (7) described above according to the present method 200. This gauging factor $R_{estimated}$ can then be used to program the IDLE period C counter 150 to schedule the duration of the immediately following IDLE period such that the foregoing process depicted in blocks 207–218 can be continuously repeated. In this manner, the mobile terminal can remain synchronized with the network terminal while achieving the herein before described benefits.

Figure 3:
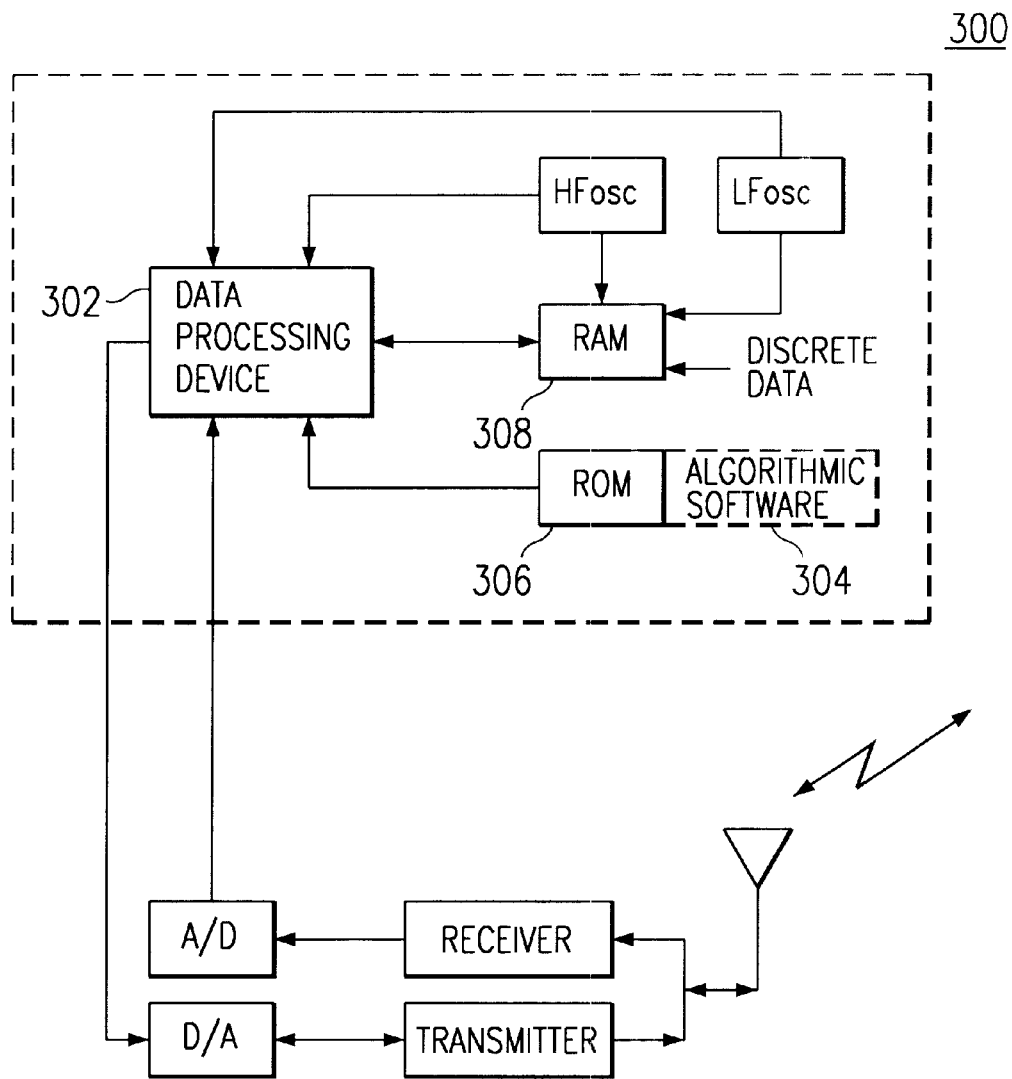
FIG. 3 is a simplified system block diagram illustrating a mobile terminal in accordance with one embodiment of the present invention.

FIG. 3 is a simplified block diagram showing a mobile terminal 300 suitable for implementing the present method 200 according to one embodiment of the present invention. The mobile terminal 300 has a data processing device 302. The present algorithmic software 304 is preferably stored in a non-destructive memory location such as in a ROM 306 or other like device. Any discrete data associated with hardware and software parameters relating to the communication network and devices described herein are preferably stored in a random access memory (RAM) 308 or other like device accessible by the data processing device 302, e.g. DSP, to implement the algorithmic software 304 such that the mobile terminal 300 time-base can be synchronized with the network time-base following an IDLE period of data transmission.

The present method then, represents a significant advancement in the art of wireless data communications. In summary, a method and structure ensures permanent synchronization between a mobile terminal and a network terminal, even during IDLE periods, without use of a high frequency oscillator. Mobile terminal power consumption is thereby reduced during IDLE communication periods, thereby preserving power consumption and increasing battery longevity.

This invention has been described in considerable detail in order to provide those skilled in the equalizer art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular communication protocols, the present inventive methods are not limited to a particular communication protocol as used herein.

What is claimed is:

1. A method of keeping a local time-base in a mobile terminal synchronized with a network time-base during a network IDLE transmission period, the method comprising the steps of:
   a) determining a mobile terminal IDLE period in high frequency oscillator units associated with a local high frequency oscillator;
   b) starting a mobile terminal gauging counter clocked by a local low frequency oscillator before commencement of the IDLE transmission period;
   c) sampling the network time-base at the end of a data transmission period via the local high frequency oscillator to determine a sampled time-base value $T_{SLEEP}$ associated with commencement of the network IDLE transmission period;
   d) starting a mobile terminal IDLE period counter clocked by the local low frequency oscillator and simultaneously stopping the local high frequency oscillator at time $T_{SLEEP}$;
   e) stopping the IDLE period counter upon completion of the IDLE period;
   f) generating a network time-base value $T_{WAKE-UP}$ upon completion of the IDLE period and determined via an algorithmic relationship between the sampled time-base value $T_{SLEEP}$, local low frequency oscillator clock cycles C counted by the IDLE period counter during the IDLE period, and a most recent previously determined gauging factor $R_{estimated}$;
   g) recovering the mobile terminal local time-base from the network time-base value $T_{WAKE-UP}$ and demodulating communication data received from the network terminal using the recovered local time-base;
   h) stopping the gauging counter upon recovery of the network time-base and determining an elapsed count value C associated with the gauging counter;
   i) generating a new gauging factor $R_{estimated}$ in local high frequency oscillator period units for the local low frequency oscillator; and
   j) repeating continuously steps b–i to maintain synchronization between the mobile terminal local time-base and the network time-base.

2. The method according to claim 1 further comprising the step of determining a high frequency oscillator periodic unit $T_{HF_{OSC}}$ associated with the mobile terminal.

3. The method according to claim 1 wherein the step g) of recovering the mobile terminal local time-base from the network time-base value $T_{WAKE-UP}$ and demodulating communication data received from the network terminal using the recovered local time-base, further comprises the step of reactivating the mobile terminal local high frequency oscillator prior to demodulating the communication data.

4. The method according to claim 1 wherein the step f) of generating a network time-base value $T_{WAKE-UP}$ further comprises determining a rounding error associated with implementation of the algorithmic relationship.

5. The method according to claim 4 wherein the step f) of generating a network time-base value $T_{WAKE-UP}$ further comprises determining an aging error associated with the local low frequency oscillator.

6. The method according to claim 5 wherein the step f) of generating a network time-base value $T_{WAKE-UP}$ further comprises determining a voltage drift error associated with the local low frequency oscillator.

7. The method according to claim 6 wherein the step f) of generating a network time-base value $T_{WAKE-UP}$ further comprises determining a temperature drift error associated with the low frequency oscillator.

8. The method according to claim 1 wherein the step i) of generating a new gauging factor comprises the step of determining an algorithmic relationship among error parameters associated with the mobile terminal.

9. The method according to claim 1 wherein the step i) of generating a new gauging factor comprises the step of determining a sampling error associated with starting and stopping the mobile terminal local high frequency oscillator during synchronization of the mobile terminal local time-base with the network terminal time-base.

10. The method according to claim 9 wherein the step i) of generating a new gauging factor further comprises the step of determining an algorithmic error associated with a demodulation algorithm delivering a time-base correction value.

11. The method according to claim 10 wherein the step i) of generating a new gauging factor further comprises the step of determining a jitter error associated with the local low frequency oscillator.

12. A mobile terminal local time-base system for keeping a local time-base synchronized with a network time-base during a network IDLE transmission period comprising:

a data processing device;

an algorithmic software directing the data processing device; and a data storage unit, wherein discrete IDLE period data, discrete low frequency oscillator data, discrete high frequency oscillator data, discrete sampling error data, discrete algorithmic error data, discrete low frequency oscillator jitter data, discrete network time-base data, discrete rounding data, discrete low frequency oscillator aging data, and discrete low frequency oscillator drift data are stored and supplied to the data processing device such that the data processing device, directed by the algorithmic software, can automatically determine a time-base value $T_{WAKE-UP}$, using algorithmically defined relationships among the discrete data, and thereby control the IDLE period timer in response to the time-base value $T_{WAKE-UP}$, such that the mobile terminal local time-base system can function to be synchronized with the network time-base.

13. The mobile terminal local time-base system according to claim 12 wherein the discrete low frequency oscillator data comprises a number C of low frequency oscillator periods determined during the network IDLE transmission period.

14. The mobile terminal local time-base system according to claim 13 wherein the discrete low frequency oscillator data further comprises a number LF of low frequency oscillator periods determined during a calibration period.

15. The mobile terminal system according to claim 12 wherein the discrete IDLE period data is defined by a communication protocol associated with the network time-base.

16. The mobile terminal system according to claim 12 wherein the discrete rounding data is associated with implementation of the algorithmic software.

17. The mobile terminal system according to claim 12 wherein the discrete rounding data is associated with implementation of mobile terminal hardware.

18. The mobile terminal system according to claim 12 wherein the discrete sampling error data is associated with synchronization of local low frequency oscillator based counter events on a mobile terminal high frequency oscillator clock.

19. The mobile terminal system according to claim 12 wherein the algorithmic software is configured to determine a recovered value of the network time-base in high frequency oscillator period units associated with the mobile terminal.

20. The mobile terminal system according to claim 18 wherein the algorithmic software is further configured to determine a gauging factor $R_{estimated}$ in terms of mobile terminal low frequency oscillator units vs mobile terminal high frequency oscillator units from which the network time-base can be recovered.

* * * * *